United States Patent
Nivala et al.

(10) Patent No.: US 9,135,588 B2
(45) Date of Patent: Sep. 15, 2015

(54) METHOD FOR CONTROLLING WORKFLOW

(75) Inventors: Antti Nivala, Pirkkala (FI); Markku Laitkorpi, Tampere (FI)

(73) Assignee: M-FILES OY, Tampere (FI)

( * ) Notice: Subject to any disclaimer, the term of this patent is extended or adjusted under 35 U.S.C. 154(b) by 288 days.

(21) Appl. No.: 13/534,723

(22) Filed: Jun. 27, 2012

(65) Prior Publication Data

US 2014/0006340 A1    Jan. 2, 2014

(51) Int. Cl.
*G06F 17/30* (2006.01)
*G06Q 10/06* (2012.01)

(52) U.S. Cl.
CPC .............. *G06Q 10/06* (2013.01); *G06F 17/301* (2013.01); *G06F 17/30997* (2013.01)

(58) Field of Classification Search
CPC ... G06F 17/30; G06F 17/301; G06F 17/3099; G06F 17/30286; G06F 17/30091; G06F 17/30371; G06F 17/3056; G06F 17/30867; G06F 17/30011; G06F 21/10; G06F 21/6227; G06F 21/31; G06F 21/60; G06F 21/78; G06F 2212/466; G06F 2221/2141; G06F 2221/2113; G06F 2221/2149
See application file for complete search history.

(56) References Cited

U.S. PATENT DOCUMENTS

| | | | |
|---|---|---|---|
| 7,236,975 B2* | 6/2007 | McCauley et al. | 1/1 |
| 7,933,924 B2* | 4/2011 | Karlsson et al. | 707/783 |
| 7,979,463 B2* | 7/2011 | Durbin | 707/781 |
| 2002/0147739 A1* | 10/2002 | Clements et al. | 707/500 |
| 2005/0114661 A1* | 5/2005 | Cheng et al. | 713/167 |
| 2006/0080316 A1* | 4/2006 | Gilmore et al. | 707/9 |
| 2007/0055666 A1* | 3/2007 | Newbould et al. | 707/9 |
| 2008/0208792 A1* | 8/2008 | Aikens et al. | 707/1 |
| 2009/0319585 A1* | 12/2009 | Gokhale | 707/205 |
| 2013/0227285 A1* | 8/2013 | Bracher et al. | 713/168 |

FOREIGN PATENT DOCUMENTS

EP    2 437 199 A2    4/2012

OTHER PUBLICATIONS

Anonymous; "M-Files User's Guide"; M-Files; Jul. 5, 2011; pp. i-6, 208-218; Retrieved from the Internet http://web.archive.org/web/20110705034710; http://www.m-files.com/eng/res/M-FilesUsersGuide.pdf, retrieved on Sep. 2, 2013; Figure 155, p. 208, pp. 210-211, pp. 214-215.

(Continued)

*Primary Examiner* — Michelle Owyang
(74) *Attorney, Agent, or Firm* — Ware, Fressola, Maguire & Barber LLP (57) ABSTRACT

The invention relates to a method for controlling state transition of an electronic object in a workflow. The method comprises receiving a request for a state transition for an electronic object from a user; determining the current state of the object from a metadata of the electronic object; determining the next state after the state transition from the request; determining one or more pseudo-users that are allowed to perform a state transition from the current state to the next state; retrieving at least one person identity by utilizing at least one property in a metadata of the electronic object, which person identity is retrieved from a value of a property corresponding to the determined one or more pseudo-users; comparing the identity of the requesting user to the retrieved person identity, and if they match; performing a state transition according to the request.

5 Claims, 4 Drawing Sheets

(56) References Cited

OTHER PUBLICATIONS

Sampaa Lahtinen; "New Features and Enhancements in M-Files 8.0"; M-Files; Mar. 4, 2012; pp. 1, 40-42; Retrieved from the Internet http://web.archive.org/liveweb; http://www.m-files.com/Content/documents/en/res/NewFeatruesM-Files8.pdf, retrieved on Sep. 2, 2013; whole document.

Anonymous; "Brochures and Technical Data", M-Files; Copyright 2011; Retrieved from the Internet http://www.m-files.com/eng/res/M-FilesUsersGuide.pdf, retrieved on Sep. 2, 2013; whole document.

* cited by examiner

Fig. 1

Contract.doc (Document)

PROPERTIES

Name: Contract.doc

Creator: David Ash

Created: 2012-06-01

Project: Web site testing

State: Audit

Content Approver: Kelly O'Neil

Content Approver: Mike Woo

Sent: 2012-06-18

Last modified: David Ash

200

Web site testing (Project)

PROPERTIES

Manager: John Elliot

Created: 2012-05-01

Participant: Susan
Participant: Natalie
Participant: Samuel
Participant: Peter

State: progress

HR: Kelly O'Neil

Last modified: David Ash

METHOD FOR CONTROLLING WORKFLOW

FIELD OF THE INVENTION

The present invention generally relates to workflows and in particular to state transitions of a workflow.

BACKGROUND OF THE INVENTION

Enterprise Content Management (ECM) system refers to a system organizing and storing organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

In the enterprise content management system, electronic objects, such as documents, proceed through a workflow having certain action states for the electronic object. The action states are appointed with certain users who have right to perform the action in question. The right can be given to individual user or a user group defined by a role. Such a role is determined at system-level so that when a user group is defined, also users belonging to such groups are statically defined.

SUMMARY OF THE INVENTION

Now there has been invented an improved method and technical equipment implementing the method, by which workflows, and especially state transitions, in an ECM system can be controlled in more delicate way. Various aspects of the invention include a method, an apparatus and a computer readable medium comprising a computer program stored therein, which are characterized by what is stated in the independent claims. Various embodiments of the invention are disclosed in the dependent claims.

According to a first aspect, the method for controlling state transition of an electronic object in a workflow, comprises receiving a request for a state transition for an electronic object from a user; determining the current state of the object from a metadata of the electronic object; determining the next state after the state transition from the request; determining one or more pseudo-users that are allowed to perform a state transition from the current state to the next state; retrieving at least one person identity by utilizing at least one property in a metadata of the electronic object, which person identity is retrieved from a value of a property corresponding to the determined one or more pseudo-users; comparing the identity of the requesting user to the retrieved person identity, and if they match; performing a state transition according to the request.

According to a second aspect, the apparatus for controlling state transition of an electronic object in a workflow, comprises a processor, memory including computer program code, the memory and the computer program code configured to, with the processor, cause the apparatus to perform at least the following: receiving a request for a state transition for an electronic object from a user; determining the current state of the object from a metadata of the electronic object; determining the next state after the state transition from the request; determining one or more pseudo-users that are allowed to perform a state transition from the current state to the next state; retrieving at least one person identity by utilizing at least one property in a metadata of the electronic object, which person identity is retrieved from a value of a property corresponding to the determined one or more pseudo-users; comparing the identity of the requesting user to the retrieved person identity, and if they match; performing a state transition according to the request.

According to a third aspect, the computer program product comprises a computer-readable medium bearing computer program code embodied therein for use with a computer, wherein the computer program code comprises code for receiving a request for a state transition for an electronic object from a user; code for determining the current state of the object from a metadata of the electronic object; code for determining the next state after the state transition from the request; code for determining one or more pseudo-users that are allowed to perform a state transition from the current state to the next state; code for retrieving at least one person identity by utilizing at least one property in a metadata of the electronic object, which person identity is retrieved from a value of a property corresponding to the determined one or more pseudo-users; code for comparing the identity of the requesting user to the retrieved person identity, and if they match; code for performing a state transition according to the request.

According to an embodiment, one or more pseudo-users allowed to perform a state transition are determined from an access control list for the state transition.

According to an embodiment, at least one person identity is retrieved directly from at least one property of the electronic object, said at least one property being indicated by at least one determined pseudo-user.

According to an embodiment, said at least one property is used as a reference to another electronic object, wherein a property of said another electronic object, which property is indicated by at least one determined pseudo-user, defines said at least one person identity.

DESCRIPTION OF THE DRAWINGS

In the following, various embodiments of the invention will be described in more detail with reference to the appended drawings, in which.

DETAILED DESCRIPTION OF THE EMBODIMENTS

In the following, several embodiments of the invention will be described in the context of enterprise content management system. It is to be noted, however, that the invention is not limited to enterprise content management system. In fact, the different embodiments have applications widely in any environment in which workflows are used for tasks, electronic objects and/or documents.

In the present disclosure "workflow" relates to business process, but especially defines rules for delivering an electronic object, e.g. a document, from a state to another. The workflow can be considered, in this application, to define a life cycle for an electronic object. In related technology, term workflow usually relates to tasks being performed during the workflow, wherein the state transitions are made according to the states and/or tasks. Various users are identified and given rights to perform a state transition.

Figure 1:
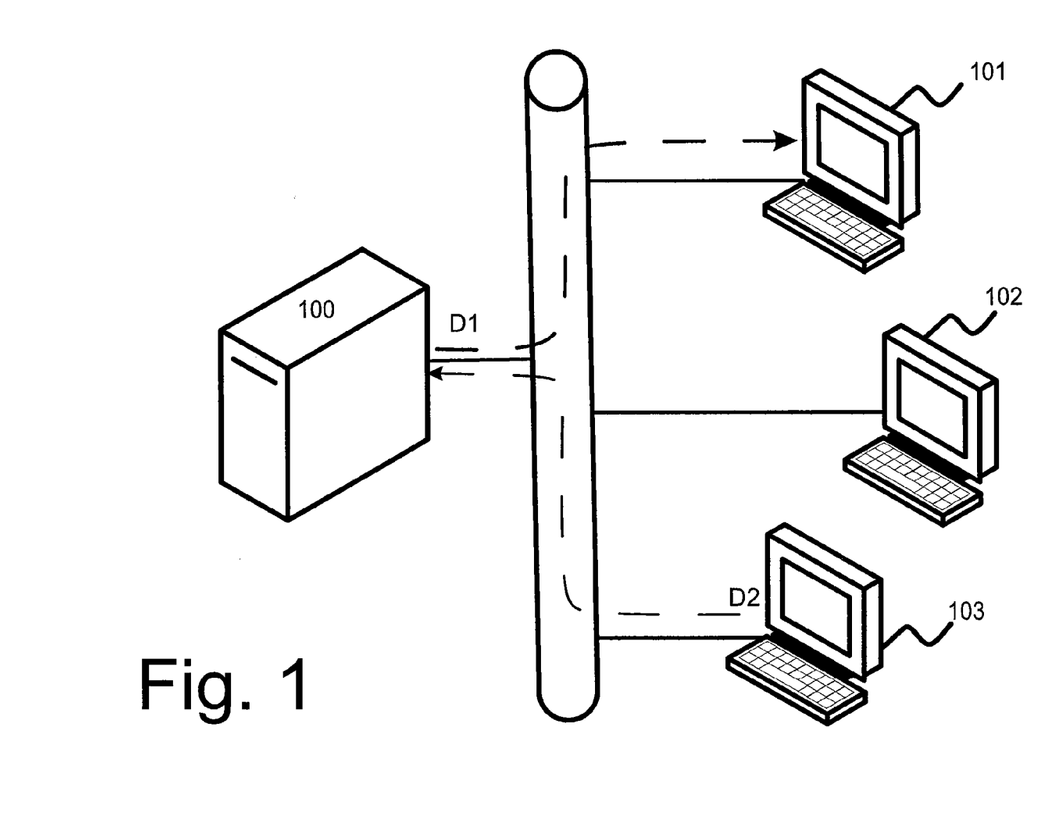
FIG. 1 shows an example of a document management system.

An example of an electronic content management (ECM) system is shown in FIG. 1 in a simplified manner. The ECM system comprises at least one server 100 for storing electronic objects such as documents. One or more client devices 101, 102, 103 can access said at least one server 100 in order to work with the stored electronic objects. In FIG. 1's example, the client device 101 retrieves a document D1, whereas the client device 103 stores a document D2 to the server 100.

The ECM system makes it possible to generate electronic workflows for electronic objects (such as documents) according to business process(es). There can be several workflows relating to one document, and each workflow may comprise various states (i.e. working status) that relate to certain actions of an electronic object (e.g. document). The electronic object can be processed by a person to whom the electronic object is assigned via the workflow state. Such a person can make a state transition to a next state after s/he has finished working with the electronic object.

A document may have workflows for defining different processes for the document. The workflow comprises states for defining the state where the document is in the workflow in question. As an example, the workflow is "Processing incoming mail". Relating to workflow "Processing incoming mail", the states can be "New message arrived", "Message assigned to assistant", "Message returned to sender", "Message processed". Workflows are controlled by rules that define persons being allowed to perform a state transition for an electronic object.

In the following example, workflow "Operating Procedure Approval" comprises states
1. Draft
2. Waiting for content approval
3. Content approved
4. Authorized for use
5. Retired Please note that the numbers in the previous example are only reference numbers that are utilized in the following description of the embodiment.

When an electronic object (e.g. a document) is transferred from a state "Draft" to a state "Waiting for content approval", the state transition is defined as 1→2. It is appreciated that a state transition 2→1 is a different state transition, as well as 1→3, 1–4 etc. are also different state transitions.

One of the functionalities of a document management system is to control who can perform a state transition for an electronic object, and which state transition is permitted for that person. The controlling can be based on an access control list (ACL) that is defined for each state transition, which access control list defines users who can perform the state transition.

Traditionally an access control entry (ACE) in the access control list of a state transition defines the rights statically by a notation <user or user group><allowed/denied>. Below is an example of the traditional way for defining rights for a state transition:

ACL for state transition 1→2:
John: Allowed
Mike: Denied
Managers: Allowed

In this example, John and any user belonging to group "Managers" are given permission to perform the state transition 1→2, whereas Mike is denied. In addition, any user not specified in the access control list is implicitly not allowed to perform the state transition.

The permission can also be defined with an implicit allowance flag, whereby an "allow"/"deny" option needs not to be used. In such a simplified approach, if a user is specified in the access control list, then such a user has the right to perform a state transition, and if a user is not specified in the access control list, then such a user does not have a right to perform a state transition.

"Managers" is a user group ("a role") that has been statically defined in the system. In order to utilize such a user group in the ACL for a state transition, it also needs to be defined who belongs to such a group, for example:
Managers:
Susan
Peter
Tom A user group may also include other user groups as its members (nested groups).

Now, the right to perform the state transition 1→2 is statically appointed to Susan, Peter and Tom according to the access control entry for Managers in "ACL for state transition 1→2". Considering all the access control entries in "ACL for state transition 1→2", the users "John", "Susan", "Peter" and "Tom" can perform state transition 1→2 for any object in a system having a state "1", whereas other users cannot.

Many systems of the related technology use the term "role" to describe a method of identifying a set of users. For example, user "Susan" may be assigned the role "Manager". It is appreciated that this is merely another point of view of how user groups are formed, since all users who have been assigned the role "Manager" can be seen to implicitly form the user group "Managers". Thus, the terms "user group" and "role" can often be used interchangeably.

Some of the traditional systems define access control entries on the basis of "users" and "user groups", while some other systems refer to "users" and "roles". It is to be noted that both of these essentially similar methods, i.e., the definition for "roles" for users and the definition of "user groups" with member users, are system-wide or workflow-wide by their nature. As a result, the approach of specifying "users" and "roles" in access control lists, which is well known in the art, does not provide enough flexibility and fine-grained control for controlling the rights for performing a specific state transition for a specific document or electronic object in a workflow, because the traditional approach does not utilize the direct and/or indirect metadata of the electronic object.

For example, the traditional methods for controlling state-transition permissions may enable defining that users with the role "Approver" can move an electronic object to the state "Approved". However, since the users having the "Approver" role are defined on the system level or on the workflow level, the traditional method does not provide means to determine the right for performing a specific state transition such as 1→2 in a dynamic manner.

In the present solution, the definition for ACL for state transition is diversified to take into account—not only the ACL for state transition—but also by utilizing the direct and/or indirect metadata of the electronic object, e.g., by determining the [Document].[ContentApprover] user from the electronic document's direct metadata, or the [Document].[Project].[ProjectManager] user from the electronic document's indirect metadata.

The electronic objects comprise metadata (i.e. data about the data), wherein the metadata refers to information on a document's properties. A creator of a file, a creation date, a project, a responsible are examples of properties of an electronic object. Metadata is composed of two parts—a definition part and a content part. The definition part defines generally the type of property; client, project, customer, creator, date, etc. The content part on the other hand specifies the value of the metadata, i.e. which client ("Earth Image Ltd"), which project ("The World"), which customer ("PhotoShoot Inc.") which creator ("Martha Stelline"), which date ("20120601"). For further example, specified values for a creator of the file or a creation date represent content of the metadata. In addition, a project which the document belongs to; a client who owns the document; a type of the document (letter, assignment, publication, order etc.); name of the document are examples of the properties of the metadata. Despite the plural form of metadata, in this disclosure, the term metadata may also refer to a singular form. Therefore, an object being defined by "metadata" may in practice be defined by one or more pieces of metadata. In the present disclosure, term "property-properties" is used as a synonym for metadata.

Figure 2:
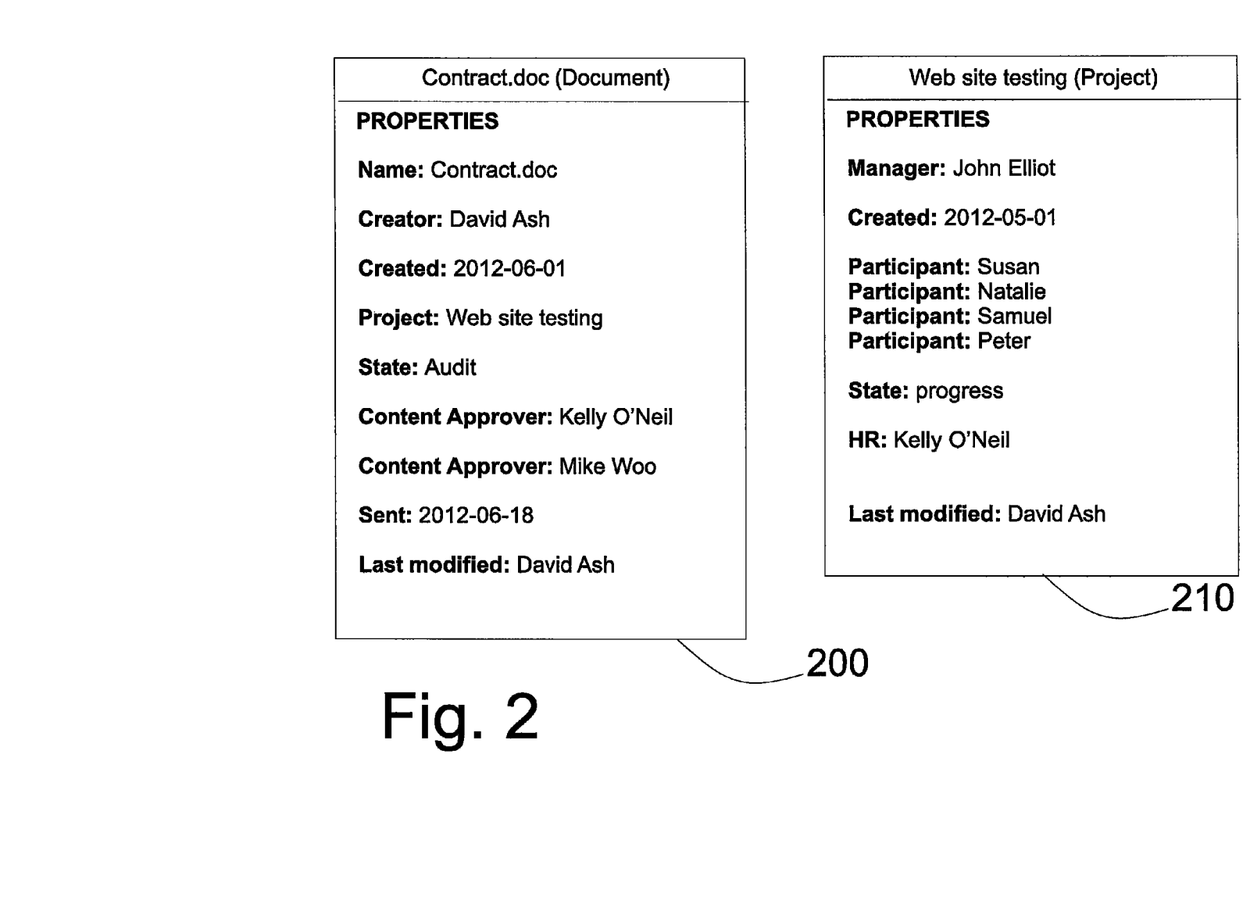
FIG. 2 shows an example of a metadata structure for a document and for a project.

Direct metadata is a list on properties that define the electronic object directly. Direct metadata is therefore the properties of the object. Indirect metadata is a list of properties for a property of the electronic object. Therefore, indirect metadata does not define the electronic object, but the property of the electronic object. The indirect metadata is thus reachable via object's property. FIG. 2 illustrates examples of metadata structures 200, 210. A document's metadata structure 200 comprises properties such as "name", "creator", "created", "project", "state", "content approver", "sent", and "last modified". A project's metadata structure 210 comprises properties such as "manager", "created", "participant", "state", "HR" and "last modified". Document's properties listed in structure 200 are document's direct metadata. Project's properties listed in structure 210 are project's direct metadata. However, project's properties listed in structure 210 are document's indirect metadata. This is because the document "contract.doc" has a property "Project" having a value "Web site testing" which refers to a project object "Web site testing" having its own properties.

For defining an ACL for state transition 2→3 of a workflow according to an embodiment of the present solution, the notation can be the following:

[Document].[ContentApprover]: Allowed

Such a notation does not give system-wide permission to users of a group "Content Approvers", but the definition dynamically takes into account the document's (or electronic object's) metadata, which document (or electronic object) is in the workflow.

Now, if the document has a property "ContentApprover", the value of which is "Susan", the ACL for state transition 2→3 defining "[Document].[ContentApprover]: Allowed" will be interpreted as a definition "Susan: Allowed". Therefore user "Susan" can make the state transition 2→3 for this document. However, user "Susan" cannot necessarily make state transition 2→3 for other documents, if those documents have a different value than "Susan" in document's "ContentApprover" property.

The previous was an example of utilizing direct metadata for defining rights to perform a state transition. In the following, an example of using indirect metadata for the same purpose will be described.

For defining an ACL for a state transition 2→3 of a workflow according to another embodiment of the solution, the notation can be the following:

[Document].[Project].[ProjectManager]: Allowed

In this notation, there is one level ("Project") of indirectness. However, there can be more than one level of indirectness via which the specified user can be reached.

The indirect notation gives rights to perform a state transition 2→3 for a document to a user that has been defined in the property "ProjectManager" of certain project's metadata, which project is defined in the "Project" property in the metadata of the document in question.

Another example of the use of indirect metadata for defining rights for state transition is described next. A document "Instructions" goes through a workflow so that at first it is assigned to state "Content approved" and after that it is assigned to state "Authorized for use".

An ACL for a state transition "Waiting for content approval→Content approved" defines "[Document].[ContentApprover]: Allowed". Therefore a user that has been defined as the value of "ContentApprover" property for the document can perform the state transition from a state "Waiting for content approval" to "Content approved".

An ACL for a state transition "Content approved→Authorized for use" defines "[Document].[ContentApprover].[Supervisor]: Allowed". By this, a supervisor of the "ContentApprover" may perform the state transition from "Content approved" to "Authorized for use". The value for the "Supervisor" can be retrieved from metadata of the person being defined in document's "ContentApprover" property.

Figure 3:
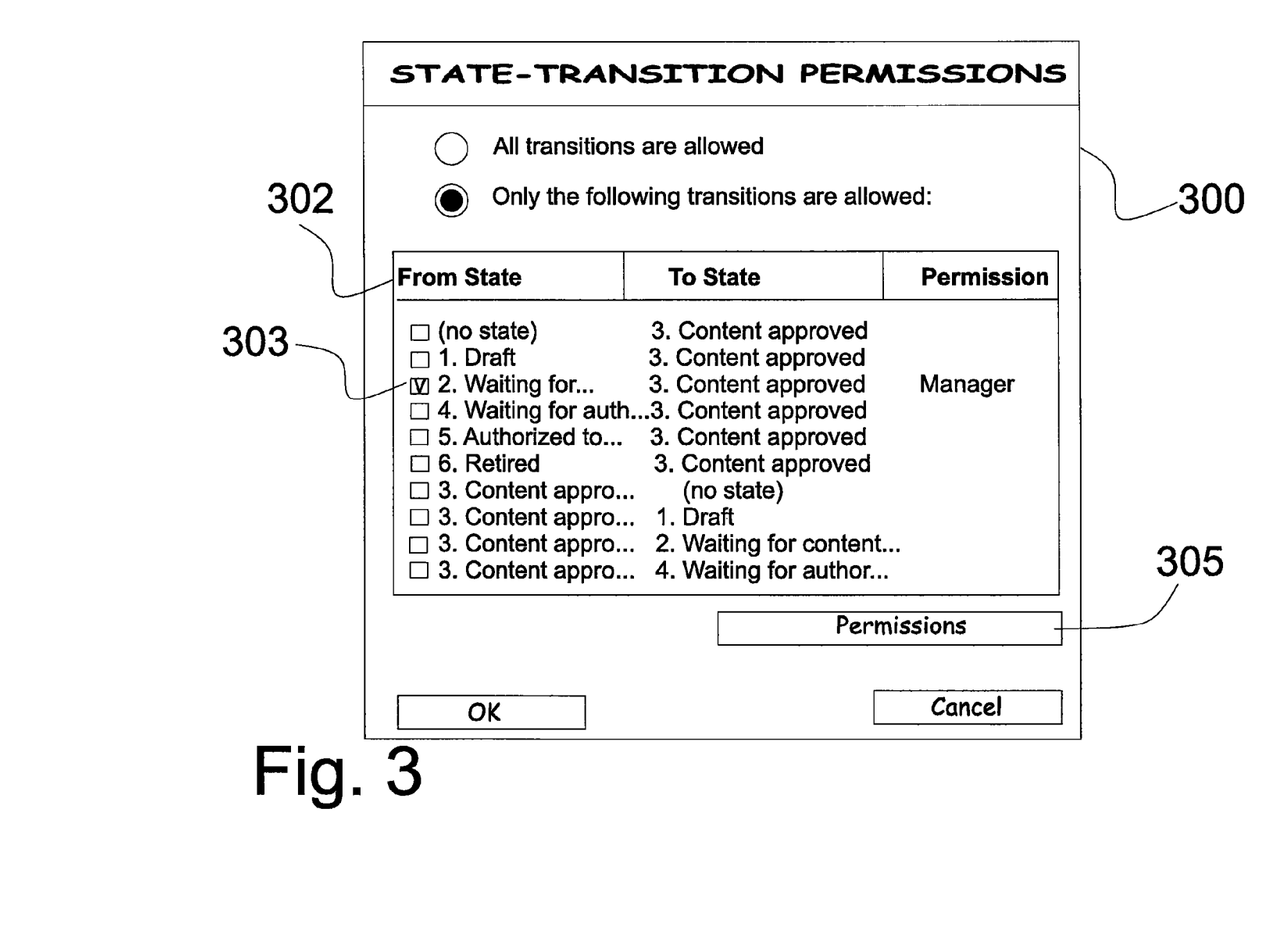
FIG. 3 shows an example of a user interface view for state-transition permissions.

The permissions for state transitions can be defined as illustrated in a user interface view shown in FIG. 3. The state-transition permission view 300 may list all the states from which the transition may be performed and all the states to which the transition may be targeted 302, and who is allowed to perform such a transition. By ticking a state transition option and selecting a button "Permissions" 305, the user may define the permissions to perform the selected state transition. Other means of displaying the state transitions can be used as well. For example, a visual diagram of all states may be displayed, and connectors or other indicators between the states in the diagram may represent state transitions between the states, and the user may define the permissions for each relevant state transition.

Figure 4:
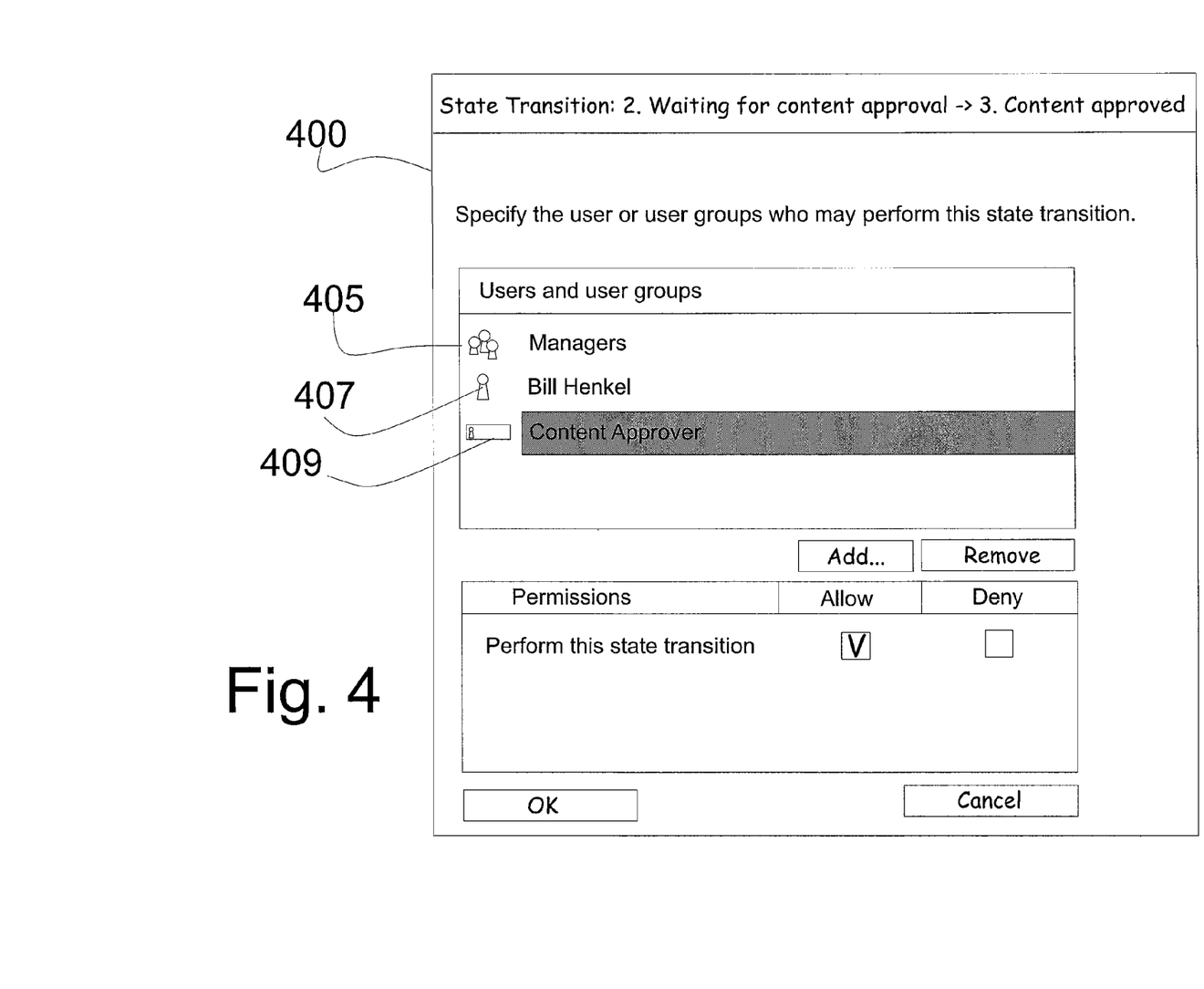
FIG. 4 shows an example of a user interface view for defining permissions for a certain state transition.

A user interface view 400 shown in FIG. 4 allows a user to define permissions for the selected state transition (being selected from a user interface shown in FIG. 3). In this example, the state transition is from "2. Waiting for content approval" to "3. Content approved". It is appreciated that in this example, rights for performing the state transition have been appointed in three different ways: directly to a group "Managers" 405, directly to a user "Bill Henkel" 407 and to a user who is defined as a "ContentApprover" in document's metadata 409.

It is appreciated that nearly any property in the metadata of the electronic object may have more than one value. This means that a property "Content approver" may define one or more users ("Susan" or "Susan", "Peter") as content approvers, one or more user groups ("Project ABS Team Members") or any combination of them ("Susan", "Peter", "Project ABS Team Members"). Therefore also the permission to perform a state transition will be appointed to one or more users, one or more user groups or any combination of those, depending on the value(s) of the property "ContentApprover".

In the previous embodiments, the permitted users are defined as dynamic (i.e. metadata based) roles of the document management system, the true character of which is defined from a direct or indirect metadata of the electronic object. Such a role without a defined person is called as a pseudo-user. An example of notation for defining a pseudo-user based on direct metadata is "[Document].[ContentApprover]". In addition, an example of notation for defining a pseudo-user based on indirect metadata is "[Document].[Project].[ProjectManager]". Often the pseudo-users are defined based on metadata of electronic objects. However, in some situations, the pseudo-users can be defined as a user who has performed a certain state transition. In such a case the pseudo-user definition may be "User who moved this object to state X", where X stands for a name of a state. This can be utilized in such a manner that a permission to perform state transition "Approved→Approval Revoked" is given to only such user who made the state transition to a state "Approved" for the particular electronic object.

The present embodiments are yet described by means of an example, where an invoice is a document that goes through the workflow. The metadata of the invoice comprises properties for "Reviewer" and "Cost unit". A state transition from "Waiting for reviewing" to "Reviewed" can be performed by a pseudo-user "Reviewer", the value of which can be obtained from the metadata of the invoice. A permission to perform the next state transition from "Reviewed" to "Accepted for paying" is indirectly defined by "[Document].[Cost unit].[Director]: Allowed", which give rights for the cost unit director, which is a property of the cost unit. Depending on which cost unit is defined to be the cost unit of the invoice, the state transition to "Accepted for paying" can be performed by such a director.

In the previous embodiments the workflow state transition can be performed by a user that is defined through direct or indirect metadata. In a traditional example the permission to perform a state transition is defined by an ACL for a state transition, defining e.g. "Carl Hillberg: Allowed" and/or "Managers: Allowed". In the present embodiments the permission can be defined by an ACL for a state transition, defining "[Document].[Responsible]: Allowed" or "[Document].[Project].[Cost unit].[Admin]: Allowed" wherein the metadata of the document (or electronic object) defines the value for the permitted user.

The present embodiments enable using pseudo-users as permitted users for performing the state transition for a workflow. Pseudo-user is a user that is defined according to metadata/properties. Pseudo-user defines a role of a user, e.g., "Creator", "Postmaster", "Assistant", "Responsible"—instead of person identities, and the identities for the pseudo-users are obtained from the metadata of a document in question. The term "pseudo-user" is an attribute that refers to a metadata item (i.e. property) representing a user or a user group. This attribute is called "pseudo-user" as long as the user item lacks a value.

As said, the present embodiments give rights to pseudo-users to perform state transition. It is appreciated that Delete/Read/Write/Access rights for a document are directly appointed to the document. However, in the present embodiments a right to perform a state transition represents different point of view. The right to perform a state transition is targeted directly to the workflow instead of the document. A certain state transition can be performed by different users depending on the document and its metadata.

The various embodiments of the invention can be implemented with the help of computer program code that resides in a memory and causes the relevant apparatuses to carry out the invention. For example, a client device may comprise circuitry and electronics for handling, receiving and transmitting data, computer program code in a memory, and a processor that, when running the computer program code, causes the client device to carry out the features of an embodiment. Yet further, a server device may comprise circuitry and electronics for handling, receiving and transmitting data, computer program code in a memory, and a processor that, when running the computer program code, causes the server device to carry out the features of an embodiment.

It is obvious that the present invention is not limited solely to the above-presented embodiments, which are given for understanding purposes, but it can be modified within the scope of the appended claims.

The invention claimed is:

1. A method for controlling state transition of an electronic object in a workflow, comprising:
receiving a request for a state transition for an electronic object from a requesting user;
determining, in response to the request, a current state of the electronic object from a property value of a metadata of the electronic object, wherein the metadata of the electronic object comprises a first plurality of properties each with a corresponding property value, wherein the property value is a value of a first property of the first plurality of properties;
determining, in response to the request, a next state after the state transition from the request;
determining, in response to the request, one or more pseudo-users that are allowed to perform a state transition from the current state to the next state;
retrieving, in response to the request, at least one person identity indirectly from a metadata of another electronic object, wherein the retrieval comprises using a value of a second property of the first plurality of properties as a reference to the another electronic object, wherein the value of the second property is different from the value of the first property,
wherein the metadata of the another electronic object comprises a second plurality of properties each with a corresponding property value, wherein the value of the second property matches a value of a first property of the second plurality of properties, wherein a second property of the second plurality of properties is different from the first property of the second plurality of properties and is indicated by at least one determined pseudo-user, and a value of the second property of the second plurality of properties defines the at least one person identity;
comparing, in response to the request, an identity of the requesting user to the retrieved person identity, and if they match; and
performing a state transition according to the request.

2. The method according to claim 1, further comprising: determining one or more pseudo-users allowed to perform a state transition from an access control list for the state transition.

3. An apparatus for controlling state transition of an electronic object in a workflow, the apparatus comprising:
a processor;
a memory including computer program code executed by the processor, wherein the processor is configured to perform at least the following operations:

receiving a request for a state transition for an electronic object from a requesting user;

determining, in response to the request, a current state of the electronic object from a property value of a metadata of the electronic object, wherein the metadata of the electronic object comprises a first plurality of properties each with a corresponding property value, wherein the property value is a value of a first property of the first plurality of properties;

determining, in response to the request, a next state after the state transition from the request;

determining, in response to the request, one or more pseudo-users that are allowed to perform a state transition from the current state to the next state;

retrieving, in response to the request, at least one person identity indirectly from a metadata of another electronic object, wherein the retrieval comprises using a value of a second property of the first plurality of properties as a reference to the another electronic object, wherein the value of the second property is different from the value of the first property, wherein the metadata of the another electronic object comprises a second plurality of properties each with a corresponding property value, wherein the value of the second property matches a value of a first property of the second plurality of properties, wherein a second property of the second plurality of properties is different from the first property of the second plurality of properties and is indicated by at least one determined pseudo-user, and a value of the second property of the second plurality of properties defines the at least one person identity;

comparing, in response to the request, an identity of the requesting user to the retrieved person identity, and if they match; and performing a state transition according to the request.

4. The apparatus according to claim 3, wherein the processor is further configured to perform at least the following operations:

determining one or more pseudo-users allowed to perform a state transition from an access control list for the state transition.

5. A computer program product comprising a memory storing computer readable code to use with a computer, the computer readable code comprising:

code to receive a request for a state transition for an electronic object form a requesting user;

code to determine, in response to the request, a current state of the electronic object from a property value of a metadata of the electronic object, wherein the metadata of the electronic object comprises a first plurality of properties each with a corresponding property value, wherein the property value is a value of a first property of the first plurality of properties;

code to determine, in response to the request, a next state after the state transition from the request; and code to determine, in response to the request, one or more pseudo-users that are allowed to perform a state transition from the current state to the next state;

code to retrieve, in response to the request, at least one person identity indirectly from a metadata of another electronic object, wherein the retrieval comprises using a value of a second property of the first plurality of properties as a reference to the another electronic object, wherein the value of the second property is different from the value of the first property, wherein the metadata of the another electronic object comprises a second plurality of properties each with a corresponding property value, wherein the value of the second property matches a value of a first property of the second plurality of properties, wherein a second property of the second plurality of properties is different from m the first property of the second plurality of properties and is indicated by at least one determined pseudo-user, and a value of the second property of the second plurality of properties defines the at least one person identity;

code to compare, in response to the request, an identity of the requesting user to the retrieved person identity, and if they match; and code to perform a state transition according to the request.

* * * * *